(12) United States Patent
Chung

(10) Patent No.: US 6,526,975 B1
(45) Date of Patent: Mar. 4, 2003

(54) DISPOSABLE GAS MASK

(76) Inventor: Geal Hyub Chung, 3642 Claridge Ct., Simi Valley, CA (US) 93063

(*) Notice: Subject to any disclaimer, the term of this patent is extended or adjusted under 35 U.S.C. 154(b) by 0 days.

(21) Appl. No.: 10/002,604

(22) Filed: Nov. 1, 2001

(51) Int. Cl.⁷ .............................. A62B 7/10; A42B 1/18
(52) U.S. Cl. ........................ 128/206.14; 128/201.17; 2/206
(58) Field of Search ................... 128/863, 200.24, 128/201.12, 201.14, 201.15, 201.17, 201.22, 201.23–201.25, 201.28, 203.29, 204.12, 205.25, 205.27, 205.28, 206.12, 206.14, 206.17, 206.18, 206.19, 206.21, 206.23–206.25, 206.27, 206.28, 207.13; 2/426, 428, 430, 446, 429, 434, 424, 9, 173, 206

(56) References Cited

U.S. PATENT DOCUMENTS

| | | | | |
|---|---|---|---|---|
| 2,056,753 A | * | 10/1936 | Wagner | 128/141 |
| 3,049,121 A | * | 8/1962 | Brumfield et al. | 128/146 |
| 3,521,630 A | * | 7/1970 | Westberg et al. | 128/206.15 |
| 3,861,381 A | * | 1/1975 | Witman et al. | 128/206.12 |
| 4,004,584 A | * | 1/1977 | Geaney | 128/206.14 |
| 4,157,090 A | | 6/1979 | Phillips | 128/141 R |
| 4,417,575 A | * | 11/1983 | Hilton et al. | 128/206.12 |
| 4,488,547 A | * | 12/1984 | Mason | 116/206 |
| 4,523,588 A | * | 6/1985 | Dolsky | 128/201.25 |
| 4,600,002 A | | 7/1986 | Maryyanek et al. | 128/206.19 |
| 4,643,182 A | * | 2/1987 | Klein | 128/201.25 |
| 4,945,574 A | * | 8/1990 | Dagher | 128/201.12 |
| 5,012,805 A | * | 5/1991 | Muckerheide | 128/205.28 |
| 5,040,530 A | * | 8/1991 | Bauer et al. | 128/201.25 |
| 5,088,485 A | * | 2/1992 | Schock | 128/202.28 |
| 5,186,165 A | * | 2/1993 | Swann | 128/201.25 |
| 5,388,570 A | * | 2/1995 | Wassil | 128/200.24 |
| 5,406,943 A | * | 4/1995 | Hubbard et al. | 128/201.17 |
| 5,427,092 A | * | 6/1995 | Shiao | 128/205.29 |
| 5,529,056 A | * | 6/1996 | Brunson et al. | 128/200.24 |
| 5,655,525 A | * | 8/1997 | Orr | 128/201.22 |
| 5,656,368 A | * | 8/1997 | Braun et al. | 128/206.12 |
| 5,694,925 A | | 12/1997 | Reese et al. | 128/206.19 |
| 5,735,720 A | | 4/1998 | Bayer | 128/206.14 |
| 5,765,556 A | | 6/1998 | Brunson | 128/206.19 |
| 5,875,775 A | * | 3/1999 | Nur et al. | 128/201.25 |
| 6,098,201 A | | 8/2000 | Boros, Sr. | 2/206 |
| 6,196,223 B1 | | 3/2001 | Belfer et al. | 128/206.25 |
| 6,216,695 B1 | * | 4/2001 | Ruben | 128/201.15 |
| 6,308,330 B1 | * | 10/2001 | Hollander et al. | 128/206.14 |
| 6,354,296 B1 | * | 3/2002 | Baumann et al. | 128/206.14 |
| 6,403,197 B1 | * | 6/2002 | Skov et al. | 428/182 |
| 6,450,165 B1 | * | 9/2002 | Silver et al. | 128/201.22 |
| 6,453,902 B1 | * | 9/2002 | Hollander et al. | 128/201.12 |

* cited by examiner

*Primary Examiner*—Aaron J. Lewis
*Assistant Examiner*—Teena Mitchell
(74) *Attorney, Agent, or Firm*—Ladas & Parry

(57) ABSTRACT

Disclosed is a disposable gas mask usable for emergency rescue purposes to save human lives from toxic gas or germ attack. The disposable gas mask includes a rectangular thin body, an eye protection window arranged at an upper portion of the body, a filter unit arranged at a lower portion of the body, a peripheral adhesive band formed at an inner surface of the body along a peripheral edge of the body while surrounding the eye protection window and the filter unit, a vertically-extending folding line centrally provided at the eye protection window, an indicator arranged between the eye protection window and the filter unit and adapted to indicate the application purpose of the gas mask, and a sealing wax band formed at an inner surface of the eye protection window and an inner surface of the filter unit inside the adhesive band along a peripheral edge of the eye protection window and a peripheral edge of the filter unit. The gas mask has a disposable type so that it is foldable and stackable into possible minimal size, also thrown away after its use. In particular, the disposable gas mask has a minimal package size, so that its carriage is convenient.

5 Claims, 8 Drawing Sheets

DISPOSABLE GAS MASK

BACKGROUND OF THE INVENTION

1. Field of the Invention

The present invention relates to a disposable gas mask usable for emergency rescue purposes to save human lives from toxic gas, fire-smoke or germ attack.

2. Description of the Related Art

Although conventional gas masks are well developed technically, they still have various limitations to be widely generalized to the public. In particular, conventional masks have an inefficiency in portability and storability and production cost.

Therefore, it has been strongly required to provide a gas mask which has a small size to be easily portable while being disposable, and includes a filter provided with an increased contact length and area and adapted to remove toxic materials from air.

SUMMARY OF THE INVENTION

The present invention has been made in view of the above mentioned requirement, and an object of the invention is to provide a portable, disposable gas mask which can be distributed for individuals or installed for emergency rescue on places where potential danger exists, while being capable of having a special type selected from several types for protecting a user against specific hazardous occasions, instead of bulky multi-purpose type.

In accordance with the present invention, this object is accomplished by providing a disposable gas mask comprising: a rectangular thin body; an eye protection window arranged at an upper portion of the body; a flat type filter unit arranged at a lower portion of the body; a peripheral adhesive band formed at an inner surface of the body along a peripheral edge of the body while surrounding the eye protection window and the filter unit; a vertically-extending folding line centrally provided at the eye protection window; an indicator arranged between the eye protection window and the filter unit and adapted to indicate the application purpose of the gas mask; and a sealing wax band formed at an inner surface of the eye protection window and an inner surface of the filter unit inside the adhesive band along a peripheral edge of the eye protection window and a peripheral edge of the filter unit.

The filter unit may comprises: an outer film having a plurality of uniformly spaced corrugations protruded inwardly from the body; an inner film having a plurality of uniformly spaced corrugations protruded outwardly from the body while alternating with the corrugations of the outer film, the inner film being divided into two portions; and a filter pad interposed between the outer and inner films, the filter pad having a plurality of filters interposed between the corrugations of the outer film and the corrugations of the inner film and arranged along two vertical lines so that they are grouped into two sets respectively covered by the portions of the inner film, each of the filters having a square cross section while being opened to the atmosphere at one end thereof and to the inside of the gas mask at the other end thereof to define a passage for inhaled gas, whereby ambient air is guided from opposite outer ends of the filter pad to inner ends of the filter pad arranged at a central portion of the gas mask.

BRIEF DESCRIPTION OF THE DRAWINGS

The above and other objects, features and other advantages of the present invention will be more clearly understood from the following detailed description taken in conjunction with the drawings, in which;

FIGS. 7a to 7c are views illustrating the case in which a check valve is installed, as an exhaust valve, in the disposable gas mask of the present invention, wherein FIG. 7a is a front view showing openings formed at an outer film of the filter unit, FIG. 7b is a sectional view showing the check valve, and FIG. 7c is a rear view showing small holes formed at an inner film of the filter unit.

DESCRIPTION OF THE PREFERRED EMBODIMENTS

Figure 1:
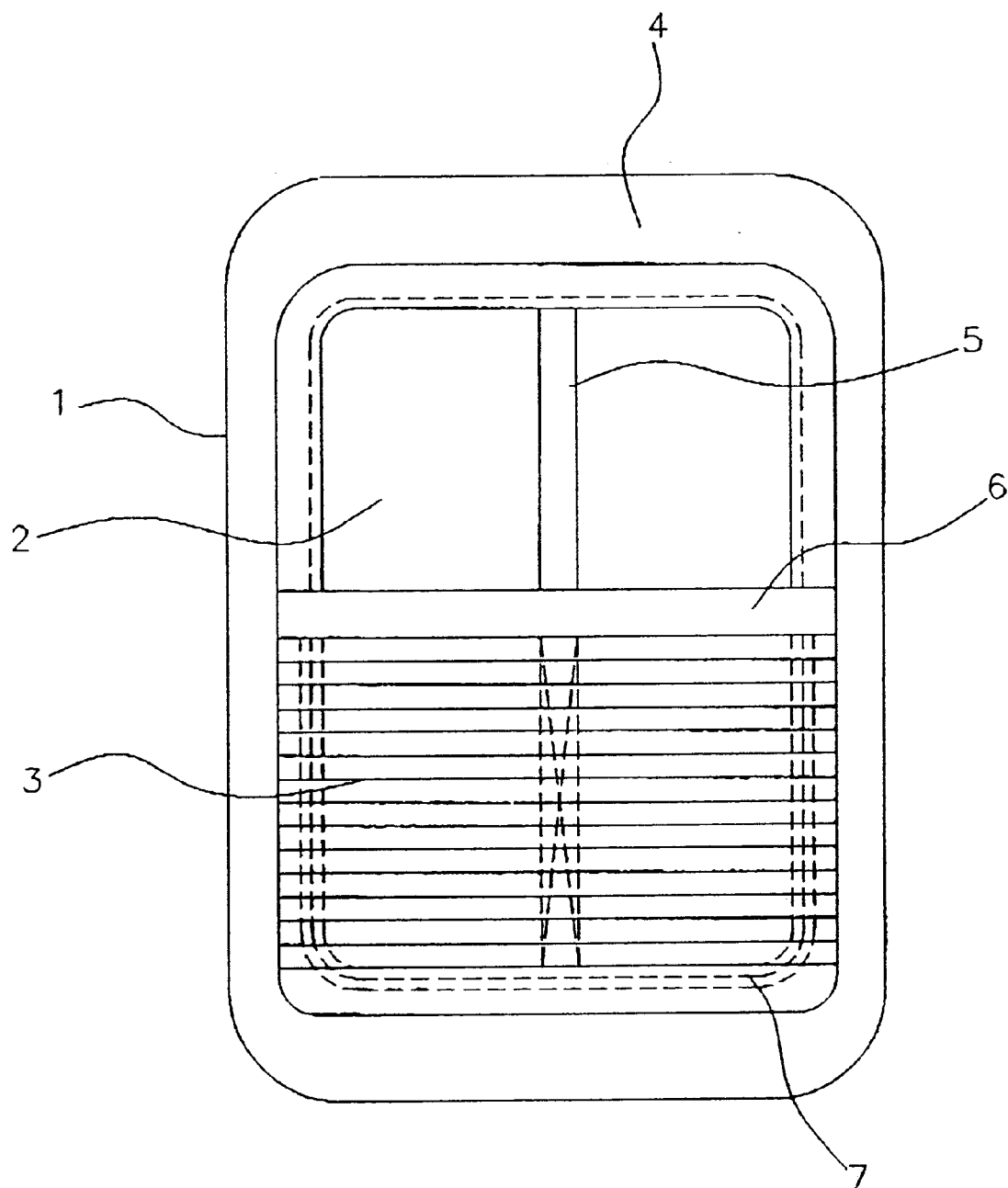
FIG. 1 is a front view illustrating a disposable gas mask according to the present invention.
Figure 2:
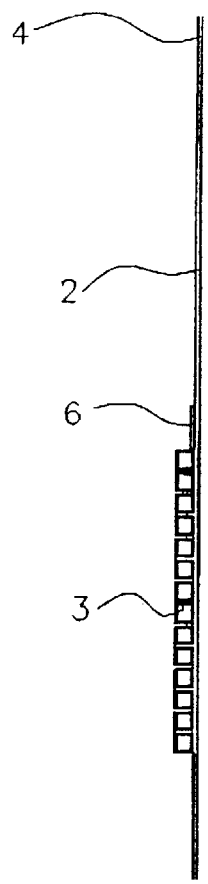
FIG. 2 is a side view illustrating the disposable gas mask according to the present invention.

FIGS. 1 and 2 are front and side views of a disposable gas mask according to the present invention, respectively. Referring to FIGS. 1 and 2, the disposable gas mask includes a rectangular thin body 1.

The disposable gas mask also includes an eye protection window 2 arranged at an upper portion of the body 1, and a filter unit 3 arranged at a lower portion of the body 1. A peripheral adhesive band 4 is formed at an inner surface of the body 1 along the peripheral edge of the body 1 so that it surrounds the eye protection window 2 and the filter unit 3.

A hydrophilic adhesive material for absorbing moisture and sweat is coated on an inner surface of the peripheral adhesive band 4.

The eye protection window 2 is made of a transparent plastic film coated, at its inner surface, with a non-fogging coating. The eye protection window 2 is centrally formed with a vertically-extending folding line 5. A sensor film for sensing toxic materials may also be coated on the inner surface of the eye protection window 2.

The folding line 5 may be formed using a heating device.

An indicator 6 is arranged between the eye protection window 2 and the filter unit 3. This indicator 6 indicates the application purpose of the gas mask.

The indicator 6 indicates characteristics and a color indicative of the application purpose of the gas mask, for example, a protection from toxic gas, or a chemical, biological, and radiological protection.

The filter unit 3 includes an outer film, an inner film, and a filter pad interposed between the outer and inner films.

Figure 3:
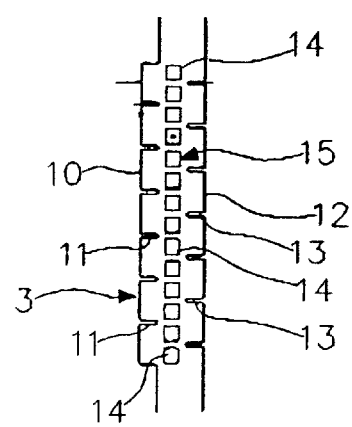
FIG. 3 is a sectional view illustrating the structure of a filter unit included in the disposable gas mask according to the present invention.

Referring to FIG. 3, the structure of the filter unit 3 according to the present invention is illustrated. As shown in FIG. 3, the outer film denoted by the reference numeral 10 has a plurality of uniformly spaced corrugations 11 protruded inwardly from the body 1, whereas the inner film denoted by the reference numeral 12 has a plurality of uniformly spaced corrugations 13 protruded outwardly from the body 1.

The corrugations 11 and 13 are arranged in such a fashion that they alternate with each other to provide elongation threshold. A plurality of filters 14 each having a square cross section are arranged between the outer and inner films 10 and 12. The filters 14 are arranged along two vertical lines in an aligned fashion, so that they are grouped into two sets, that is, left and right sets. The filter pad, which is denoted by the reference numeral 15, is formed of the filters 14. The outer film 10 has a single structure, whereas the inner film 12 is divided into two portions respectively corresponding to the left and right filter sets. Thus, the films 10 and 12 form a pad structure enclosing the left and right filters 14. Each filter 14 covered by the films 10 and 12 is opened to the atmosphere at one end thereof while being opened to the inside of the gas mask at the other end thereof, thereby defining a passage for inhaled gas. Accordingly, ambient air can be guided from opposite outer ends of the filter pad 15 to inner ends of the filter pad 15 arranged at the central portion of the gas mask.

The outer end surface of the filter pad 15 is coated with a water-repellent coating, so as to prevent water from being introduced into the inside of the gas mask via the filter pad 15.

The outer and inner films 10 and 12 of the filter unit 3 are made of a flexible plastic film. The filter unit 3 has, at its lower end, an extension which extends beyond the chin of the user when the gas mask is worn by the user. The extension of the filter unit 3 is quilted to have a flexibility capable of conforming to motions of the user's chin.

Referring again to FIG. 1, a sealing wax band 7 is formed at the inner surfaces of the eye protection window 2 and filter unit 3 inside the adhesive band 4 along the peripheral edges of the eye protection window 2 and filter unit 3. The sealing wax band 7 is adapted to seal fine gaps formed at the face of the user by hairs or wrinkles. The sealing wax is something like mild paste glue.

A protective sheet (not shown) is attached to the inner surface of the body 1 to cover the adhesive band 4 and sealing wax band 7.

Figure 4:
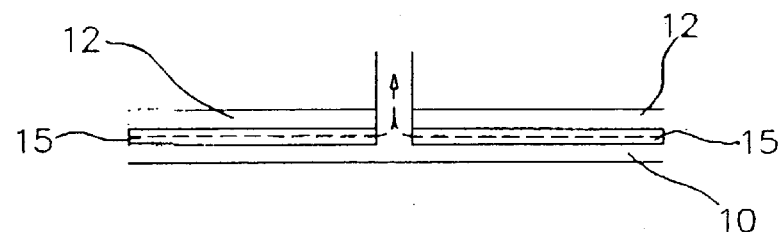
FIG. 4 is a cross-sectional view illustrating the filter unit of the present invention.

FIG. 4 shows the cross section of the filter unit 3 according to the present invention. As shown in FIG. 4, the outer film 10 has a single structure, whereas the inner film 12 is divided into two portions respectively corresponding to the left and right filter sets. Thus, the left and right filters 14 are surrounded by the outer and inner films 10 and 12.

Accordingly, ambient air is introduced into the filter pad 15 through the outer ends of the filter pad 15, guided to the inner ends of the filter pad 15, and then introduced into the central portion of the outer film 10 where no portion of the filter pad 15 is present, so that it enters the inner space defined inside the inner film 12 between the gas mask and the face of the user.

The filter unit 3 may be manufactured by laying the filter pad 15 on the outer film 10 made of a plastic film, laying the inner film 12 on the filter pad 15, and then pressing the resulting structure using a heating roller. If necessary, the outer film 10, filter pad 15 and inner film 12 may be subjected to a heat shrinking treatment so that they come into close contact with one another.

The filter pad 15 has a tube structure capable of providing an air passage length meeting the time required for a sufficient reaction between toxic gas and a counteracting compound.

In accordance with the present invention, the filter pad 15 is manufactured to be added with an effective counteracting compound, as in general filters. In the manufacturing process, the filter pad 15 may be cut to a desired size to have a modular structure. In particular, the filter pad 15 has a square cross-sectional shape to have a maximum cross-sectional area. If desired, the filter pad 15 may be divided into at least two portions, so as to fill the effective counteracting compound between those portions.

The effective counteracting compound received in the filter pad 15 is basically designed to maintain its effectiveness for a certain limited period of time allowing the user to escape danger, for example, 30 minutes, even though the effective time may vary depending on the chemical characteristics of the effective counteracting compound. Of course, the filter pad 15 may have a lengthened effective time by varying its characteristics.

The protective sheet attached to the adhesive band 4 may include a first protective sheet for covering an upper portion of the adhesive band 4, and a second protective sheet for covering the remaining, lower portion of the adhesive band 4

The gas mask of the present invention is designed for an easy application thereof. That is, since the gas mask is not designed for specially-trained persons, but designed for general use, it is desirable to print graphic illustration without letterings for instant application. Primarily, anyone can peel off the protective sheet at the upper part of the gas mask to attach the mask to their forehead to secure its position, and then pull down the other protective sheet at the lower part of the gas mask while gradually sweeping down the peripheral portion of the gas mask, that is, the adhesive band 4, with thumb and fingers to secure an airtight seal.

After the application of the gas mask, oral communication can be made in accordance with a resonance generated at the plastic films. After the effective time expires, the gas mask is replaced by a new one.

The disposable gas mask of the present invention having the above mentioned configuration is not required to use an exhaust valve, which is equipped in conventional gas masks.

In existing gas masks or baggy-type masks, use of an exhaust valve is absolutely necessary. This is because the volume of the inner space defined between the gas mask and the face of the user is large, relative to the breath capacity of the user.

Since the disposable gas mask of the present invention is configured to come into close contact with the face of the user, it defines a minimal inner space volume. Accordingly, it is possible to generate an increased inner pressure with respect to outer pressure with a reduced volume of exhaled air, as compared to conventional gas masks, thereby allowing a greater volume of air to be exhausted with each breath pressure. In this regard, the gas mask of the present invention is not required to have any exhaust valve.

Of course, a separate exhaust valve may be used in order to obtain an increased exhaust efficiency.

Figure 7A:
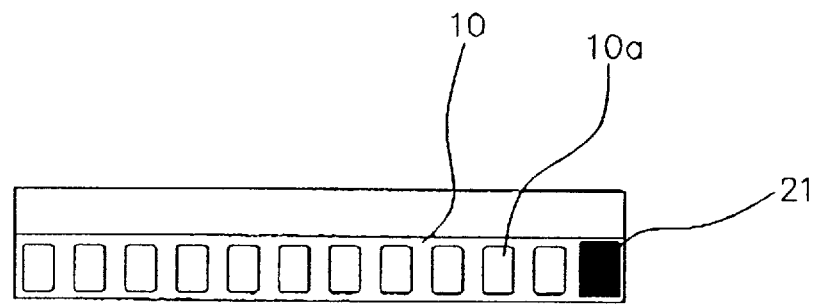
Figure 7B:
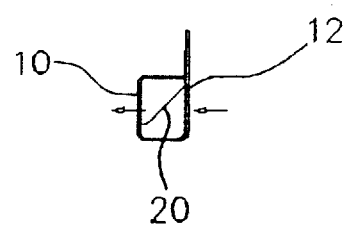
Figure 7C:
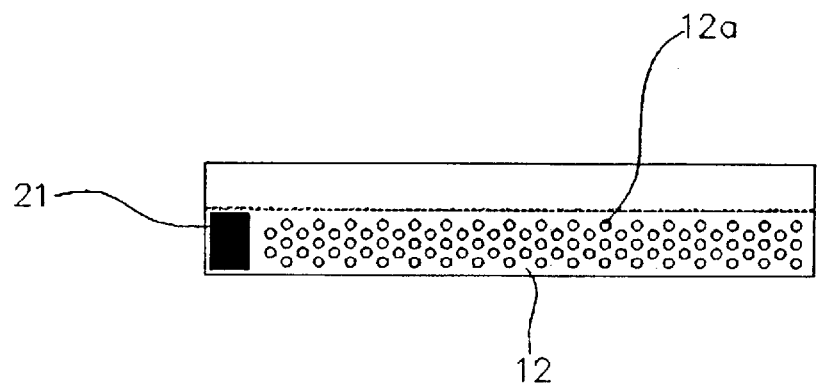

An example of such an exhaust valve is illustrated in FIGS. 7a to 7c. In the illustrated case, a check valve 20 is used which may be installed on the outer film 10 of the filter unit 3 while extending horizontally to cover at least one of the filters 14, as shown in FIG. 7b. In this case, the portion of the outer film 10 covering the filter 14 is formed with a plurality of openings 10a, as shown in FIG. 7a. Also, the portion of the inner film 12 covering the filter 14 is formed with a plurality of small holes 12a, as shown in FIG. 7c. An end block 21 is fitted in the outer end of the filter 14 in order to prevent ambient air from being introduced into the filter 14 through the outer end of the filter 14. The check valve 20 allows exhaled air to be outwardly discharged from the filter 14 via the openings boa, as indicated by the arrows shown in FIG. 7b, while preventing ambient air from being introduced into the inside of the gas mask via the openings 10a. When the user inhales, ambient air is introduced into the inside of the gas mask via the remaining filters 14.

FIGS. 5a to 5d illustrate the procedure of packing the disposable gas mask according to the present invention.

Figure 5A:
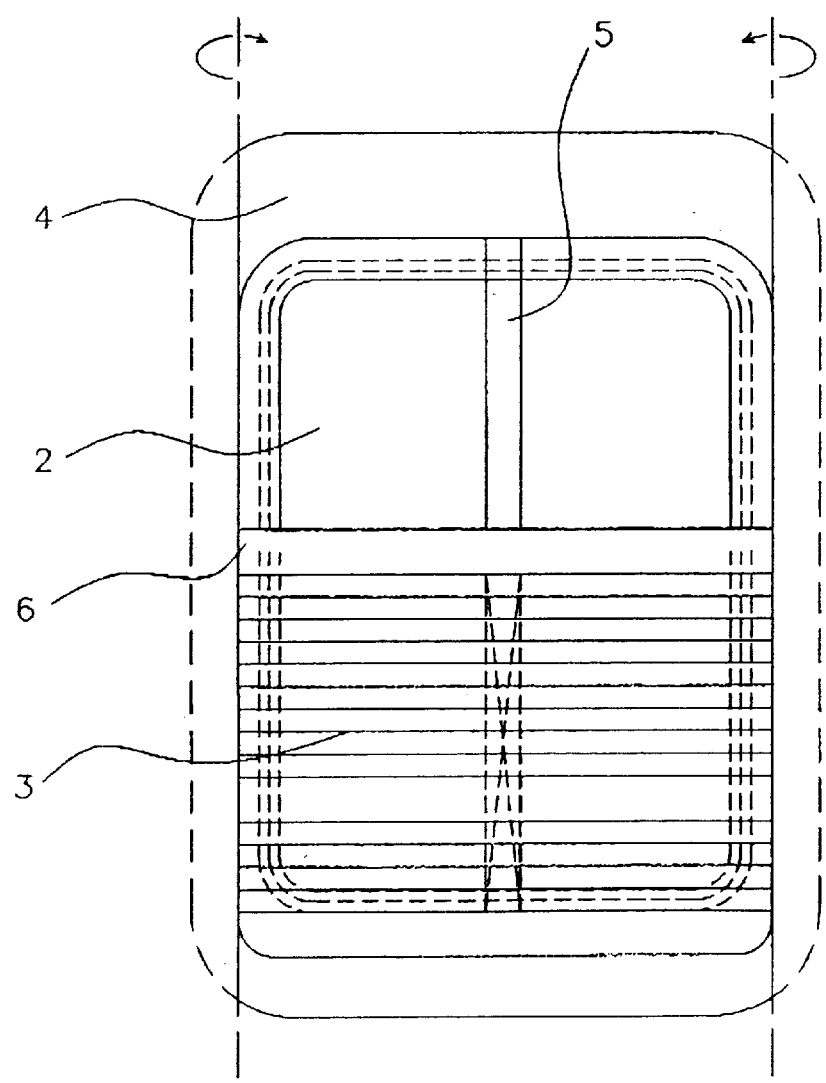
FIGS. 5a to 5d are schematic views respectively illustrating processing steps of a procedure for packing the disposable gas mask of the present invention.

Referring to FIG. 5a, the vertical peripheral portions of the gas mask, that is, the vertical portions of the adhesive band 4, are first inwardly folded along the vertically-extending peripheral edges of the eye protection window 2 and filter unit 3 adjacent thereto, respectively.

Figure 5B:
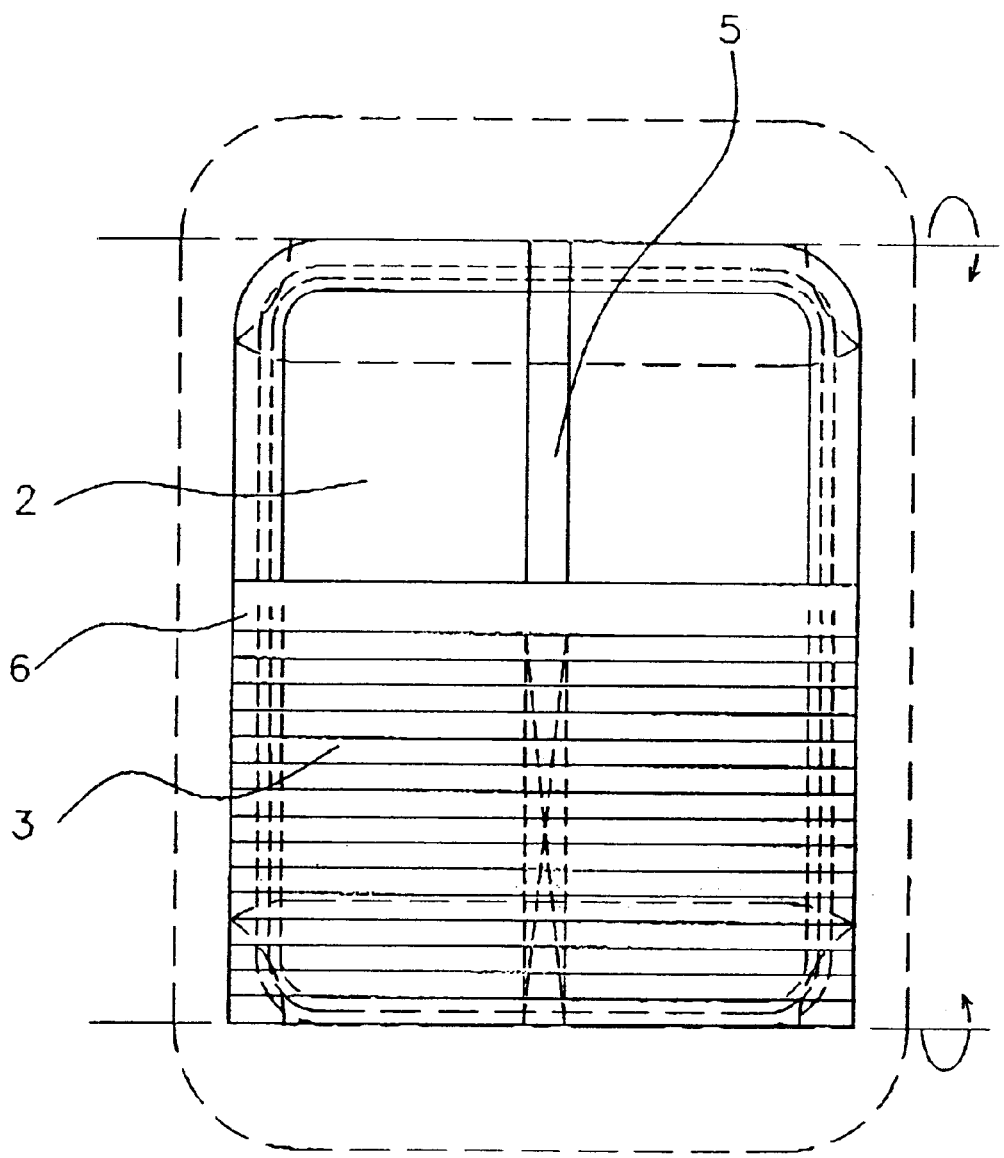

Thereafter, the horizontal peripheral portions of the gas mask, that is, the horizontal portions of the adhesive band 4, are inwardly folded along the horizontally-extending peripheral edges of the eye protection window 2 and filter unit 3 adjacent thereto, respectively, as shown in FIG. 5b.

Figure 5C:
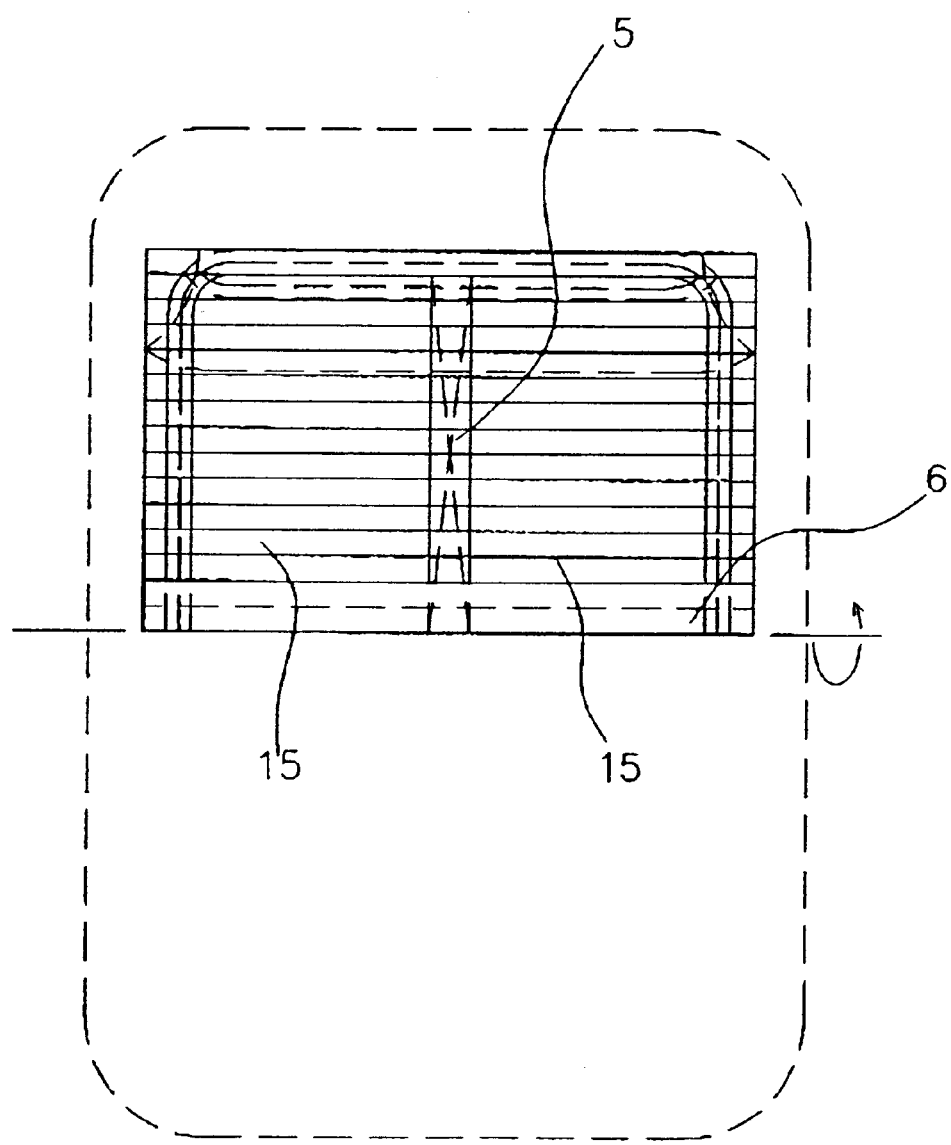

The gas mask is then inwardly folded along the indicator 6 extending horizontally between the eye protection window 2 and filter unit 3, as shown in FIG. 5c.

Figure 5D:
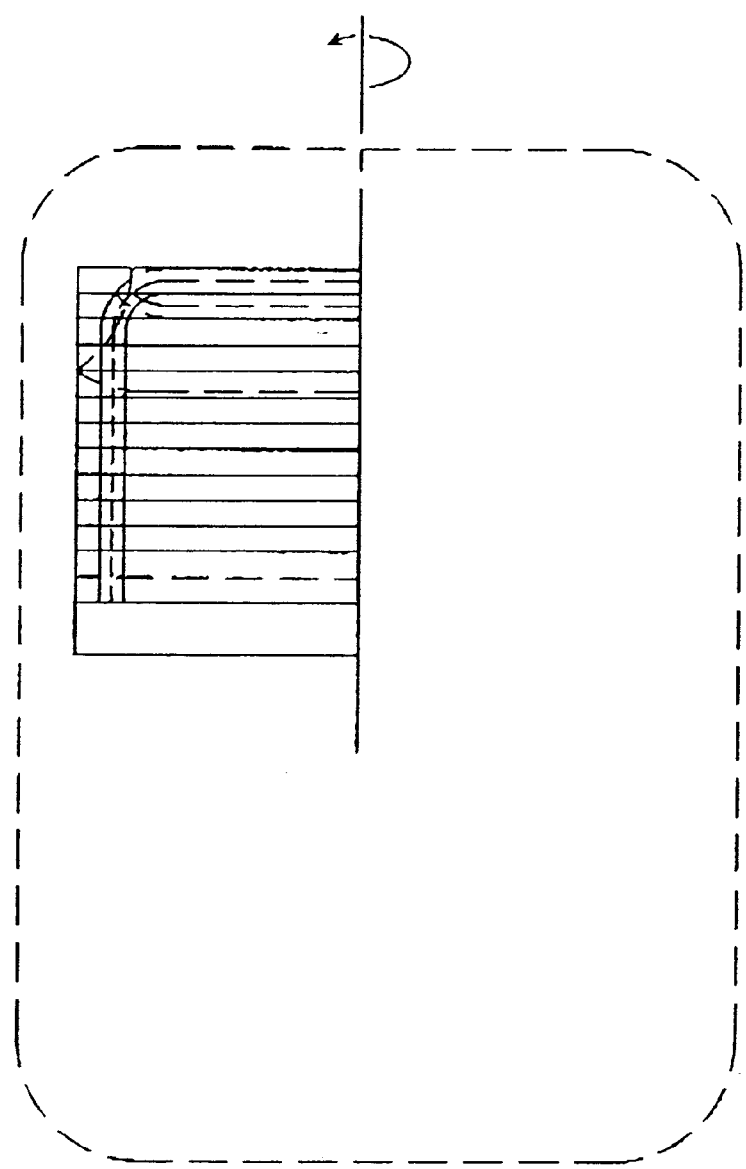

The folded gas mask is subsequently inwardly folded again along the folding line 5 of the eye protection window 2 where no portion of the filter pad 15 is present. The resulting gas mask is shown in FIG. 5d.

In accordance with the above described packing method, the gas mask of the present invention can be packaged into a minimum size for daily carriage, easy transportation, and mass installation.

Figure 6:
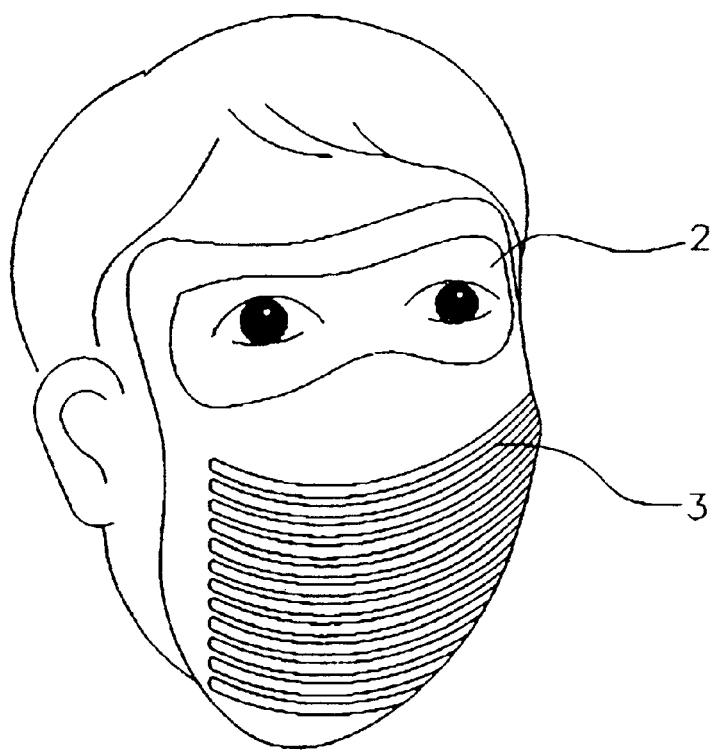
FIG. 6 is a schematic view illustrating the state of the disposable gas mask of the present invention worn by the user.

FIG. 6 shows the state of the disposable gas mask of the present invention worn by the user. As shown in FIG. 6, the eye protection window 2 and filter unit 3, which have an integral structure, simultaneously protect the eyes and respiratory organs of the user. The eye protection window is supported by the nose, thereby giving a reasonable inner breathing space.

The packing of the disposable gas mask according to the present invention may be achieved in the form of unit packing. In this case, the packaged gas mask may be attached to a hat, military helmet, belt, or hand-held weapon. The gas mask can be sealably packed for its protection against air and moisture. The package of the gas mask may be provided with a tear-off string in order to achieve an easy and convenient opening thereof.

The packing of the disposable gas mask may also be achieved in the form of multiple-packing. In this case, the packed products may be installed with fire-extinguisher in subway stations, buildings, camps, etc. Also, the packed products may be installed on fire engines, military tanks, ships, other rescue vehicles, etc. In addition, the packed products may be stored in warehouses for storing relief supplies.

The disposable gas mask of the present invention can be inexpensively mass produced using a consistent automated production process, such as, silk-screening adhesive components and silicon rubber band on the protective paper sheet, also attaching vision window and filter pad unit, etc. over it. In particular, the disposable gas mask occupies a minimal space, whereby it can be installed for emergency rescue at places where potential danger exists. Although existing gas masks having a satisfactory effectiveness have been sufficiently prepared for emergency situations, their daily carriage or installation is impossible. In this regard, the gas mask of the present invention can be suitably used for instant emergency rescue until the user reaches the existing gas mask.

For example, even in the case in which gas masks are distributed to all people, it is very unlikely that those gas masks will be always carried. Normally, these gas masks may be stored in certain destined locations. In other words, the gas masks can be used only when is reachable such as in home. Of course, in already-promulgated or expected emergency situations, all persons may carry their gas masks. In practical cases, however, a large number of gas masks corresponding to several times the total number of persons should be prepared, so as to allow anyone to get a gas mask at any place for sudden, unexpected emergency situations. This causes significant problems involved with cost, preparation, installation, and maintenance.

The disposable gas mask of the present invention can be used for military purposes or purposes of protection from fire and terror, and in rescue fields or working fields.

For the working field purposes, the disposable gas mask can be used in agricultural insecticide spraying, painting, toxic gas or powder handling, sewage work, powder spraying, pasteurizing, laboratory research, etc.

The disposable gas mask of the present invention can have a type varying depending on the application thereof.

The disposable gas mask Of the present invention may also be provided with liquid oxygen pellets having a very small size, adapted to supply oxygen so that it is used for in-home emergency care.

In accordance with the present invention, the eye protection window of the disposable gas mask may be appropriately tinted, so as to allow the gas mask to be used for the purpose of shielding harmful rays.

The disposable gas mask of the present invention uses a pad type filter unit in place of conventional cylindrical filtering canisters. Accordingly, the disposable gas mask can have various advantages. For example, where soldiers perform a fighting task or a training while carrying the disposable gas mask of the present invention, there is no inconvenience caused by the gas mask.

After a certain period of time elapses, the disposable gas mask of the present invention should be thrown away because the effectiveness of the counteracting compound provided at the filter unit is lost even though the gas mask has not been used.

As apparent from the above description, the present invention provides a disposable gas mask which can be inexpensively mass produced using a consistent automated production process, so as to meet a requirement that the gas mask can be thrown away after its use. In particular, the disposable gas mask of the present invention has a minimal package size, so that its carriage is convenient. Accordingly, for regions in danger of war or terror, the disposable gas mask of the present invention must be distributed as the very first required item in the preparation process.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A disposable gas mask comprising:
    a rectangular thin body;
    an eye protection window arranged at an upper portion of the body;
    a filter unit arranged at a lower portion of the body;
    a peripheral adhesive band formed at an inner surface of the body along a peripheral edge of the body while surrounding the eye protection window and the filter unit;

a vertically-extending folding line centrally provided at the eye protection window;

an indicator arranged between the eye protection window and the filter unit and adapted to indicate the application purpose of the gas mask; and a sealing wax band formed at an inner surface of the eye protection window and an inner surface of the filter unit inside the adhesive band along a peripheral edge of the eye protection window and a peripheral edge of the filter unit.

2. The disposable gas mask according to claim 1, wherein the filter unit comprises:

an outer film having a plurality of uniformly spaced corrugations protruded inwardly from the body;

an inner film having a plurality of uniformly spaced corrugations protruded outwardly from the body while alternating with the corrugations of the outer film, the inner film being divided into two portions; and a filter pad interposed between the outer and inner films, the filter pad having a plurality of filters interposed between the corrugations of the outer film and the corrugations of the inner film and arranged along two vertical lines so that they are grouped into two sets respectively covered by the portions of the inner film, each of the filters having a square cross section while being opened to the atmosphere at one end thereof and to the inside of the gas mask at the other end thereof to define a passage for inhaled gas, whereby ambient air is guided from opposite outer ends of the filter pad to inner ends of the filter pad arranged at a central portion of the gas mask.

3. The disposable gas mask according to claim 2, wherein the filter pad is coated with a water-repellent coating at each outer end thereof to prevent water from being introduced into the inside of the gas mask via the filter pad.

4. The disposable gas mask according to claim 1, further comprising:

a protective sheet attached to the inner surface of the body to cover the adhesive band, the protective sheet comprising a first protective sheet for covering an upper portion of the adhesive band, and a second protective sheet for covering the remaining, lower portion of the adhesive band, to allow a user to easily wear the gas mask by peeling off the first protective sheet at an upper part of the gas mask to attach the gas mask to his forehead to secure the position of the gas mask, and then pulling down the second protective sheet at a lower part of the gas mask while gradually sweeping down the adhesive band with thumb and fingers to secure an airtight seal.

5. A method for packing a gas mask including a rectangular thin body, an eye protection window arranged at an upper portion of the body, a filter unit arranged at a lower portion of the body, a peripheral adhesive band formed at an inner surface of the body along a peripheral edge of the body while surrounding the eye protection window and the filter unit, a vertically-extending folding line centrally provided at the eye protection window, an indicator arranged between the eye protection window and the filter unit and adapted to indicate the application purpose of the gas mask, and a sealing wax band formed at an inner surface of the eye protection window and an inner surface of the filter unit inside the adhesive band along a peripheral edge of the eye protection window and a peripheral edge of the filter unit, comprising the steps of;

inwardly folding vertical peripheral portions of the gas mask, where vertical portions of the adhesive band are arranged, along vertically-extending peripheral edges of the eye protection window and filter unit adjacent thereto, respectively;

inwardly folding horizontal peripheral portions of the gas mask, where horizontal portions of the adhesive band are arranged, along horizontally-extending peripheral edges of the eye protection window and filter unit adjacent thereto, respectively;

inwardly folding along the indicator extending horizontally between the eye protection window and the filter unit; and inwardly folding the gas mask along the folding line of the eye protection window where no portion of the filter unit is present, whereby the gas mask is packed to have a minimal size.

* * * * *